(12) United States Patent
Barber et al.

(10) Patent No.: US 11,987,393 B2
(45) Date of Patent: May 21, 2024

(54) LAUNCH LOCK SYSTEM WITH INCREASED RELEASE CLEARANCE IN ALL DIRECTIONS

(71) Applicant: HONEYWELL INTERNATIONAL INC., Morris Plains, NJ (US)

(72) Inventors: Timothy Barber, Litchfield Park, AZ (US); Ken E. Young, Peoria, AZ (US); Timothy Hindle, Peoria, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 776 days.

(21) Appl. No.: 16/930,990

(22) Filed: Jul. 16, 2020

(65) Prior Publication Data
US 2022/0017243 A1    Jan. 20, 2022

(51) Int. Cl.
*B64G 1/64* (2006.01)
*F16B 2/02* (2006.01)

(52) U.S. Cl.
CPC ............... *B64G 1/64* (2013.01); *F16B 2/02* (2013.01); *Y10T 403/59* (2015.01)

(58) Field of Classification Search
CPC .......... B64G 1/64; B64G 1/641; B64G 1/645; B64G 2001/643; F16B 2/02; F16B 2/06; F16B 2/10; F16B 2/14; F16B 2/18; F16B 2/185; Y10S 403/04; Y10T 403/59; Y10T 403/591; Y10T 403/60; Y10T 403/602; Y10T 403/608; Y10T 403/7064; Y10T 403/7066

USPC ......... 403/321, 322.1, 326, 327, 330, 374.1, 403/374.2, DIG. 4; 244/172.9, 173.1, 244/173.2, 173.3
See application file for complete search history.

(56) References Cited

U.S. PATENT DOCUMENTS

| | | | |
|---|---|---|---|
| 3,346,929 A | 10/1967 | Webb | |
| 4,395,006 A | 7/1983 | Taylor | |
| 4,976,399 A | 12/1990 | Bay et al. | |
| 5,040,748 A | 8/1991 | Torre et al. | |
| 5,119,555 A | 6/1992 | Johnson | |
| 5,125,601 A | 6/1992 | Monford, Jr. | |
| 5,320,395 A * | 6/1994 | Gernhardt | B64G 1/641 244/172.4 |

(Continued)

FOREIGN PATENT DOCUMENTS

| | | | |
|---|---|---|---|
| CN | 106742081 A | 5/2017 | |
| FR | 2869003 A1 * | 10/2005 | ............ F16B 2/06 |
| JP | H04193700 A | 7/1992 | |

*Primary Examiner* — Josh Skroupa
(74) *Attorney, Agent, or Firm* — Lorenz & Kopf, LLP

(57) ABSTRACT

A launch lock system includes a first portion rigidly coupled to the second portion in a first state and the first portion movable in all directions relative to the second portion in a second state. The launch lock system includes a fastener subassembly coupled to the second portion, and the fastener subassembly is movable relative to the second portion from a first position to a second position. The launch lock system includes at least one pivot arm subassembly having a pivot arm movable between a first position and a second position. The pivot arm is coupled to the first portion in the first position. In the first state, the pivot arm is in the first position and cooperates with the fastener subassembly in the first position, and in the second state, the pivot arm is uncoupled from the first portion and the fastener subassembly.

18 Claims, 8 Drawing Sheets

(56) References Cited

U.S. PATENT DOCUMENTS

| | | | |
|---|---|---|---|
| 6,116,118 A * | 9/2000 | Wesch, Jr. | E21B 19/161 |
| | | | 81/57.16 |
| 6,129,315 A | 10/2000 | Benoliel et al. | |
| 6,418,870 B1 | 7/2002 | Lanowy et al. | |
| 6,467,987 B1 | 10/2002 | Larsen et al. | |
| 6,557,475 B1 | 5/2003 | Nygren et al. | |
| 6,767,155 B2 | 7/2004 | O'Brien et al. | |
| 6,896,441 B1 * | 5/2005 | Champagne | B64G 1/645 |
| | | | 403/326 |
| 6,935,805 B2 | 8/2005 | O'Brien et al. | |
| 7,828,249 B2 * | 11/2010 | Ritter | B64G 1/646 |
| | | | 244/172.4 |
| 7,861,974 B2 * | 1/2011 | Hays | B64G 1/646 |
| | | | 244/172.4 |
| 8,021,069 B2 | 9/2011 | Baghdasarian | |
| 8,568,053 B2 | 10/2013 | Baghdasarian | |
| 8,678,323 B2 * | 3/2014 | Barber | B64G 1/641 |
| | | | 244/173.1 |
| 9,604,738 B2 | 3/2017 | Laughlin | |
| 9,663,249 B2 | 5/2017 | Lively et al. | |
| 10,232,960 B2 | 3/2019 | Vezain et al. | |
| 10,293,960 B2 * | 5/2019 | Shafer | B64G 1/64 |
| 10,377,510 B1 | 8/2019 | Riskas et al. | |
| 2005/0263649 A1 * | 12/2005 | Ritter | B64G 1/646 |
| | | | 244/172.4 |
| 2016/0325928 A1 * | 11/2016 | Lepek | F16B 2/14 |
| 2021/0300602 A1 * | 9/2021 | Bultitude | B64G 1/641 |
| 2021/0364019 A1 * | 11/2021 | Wang | F16B 2/02 |

\* cited by examiner

LAUNCH LOCK SYSTEM WITH INCREASED RELEASE CLEARANCE IN ALL DIRECTIONS

STATEMENT REGARDING FEDERALLY SPONSORED RESEARCH OR DEVELOPMENT

This invention was made with Government support under 80GSFC19C0061 awarded by NASA. The Government has certain rights in the invention.

TECHNICAL FIELD

The present disclosure generally relates to spacecraft isolation systems, and more particularly relates to a launch lock system having increased clearance in all directions when released.

BACKGROUND

Control moment gyroscope arrays, reaction wheel arrays, and other such devices deployed onboard spacecraft for attitude adjustment purposes generate vibratory forces during operation. Spacecraft isolation systems are commonly employed to minimize the transmission of vibratory forces emitted from such attitude adjustment devices, through the spacecraft body, to any vibration-sensitive components (e.g., optical payloads) carried by the spacecraft. Spacecraft isolation systems commonly include a number of individual vibration isolators (typically three to eight isolators), which are positioned between the spacecraft payload and the spacecraft body in a multi-point mounting arrangement.

Spacecraft isolation systems may also be equipped with launch lock systems that are positioned between the spacecraft and the payload support structure in parallel with the isolators. During spacecraft launch, the launch lock systems maintain the payload support structure in a fixed spatial relationship with the spacecraft. In so doing, the launch lock systems shunt significant inertial or shock loads generated during spacecraft launch around the isolators to protect the isolators from these shock loads generated during spacecraft launch. At a desired juncture after launch, the launch lock assemblies are actuated to release and allow relative movement between the payload support structure and the spacecraft. The payload support structure, supported by or "floating on" the isolators, is now able to move relative to the spacecraft and the isolators function collectively to damp vibrations transmitted between the payload support structure and the spacecraft body. In certain instances, in order to damp vibrations, the isolators require a larger range of motion. The range of motion of the isolators is limited by a clearance provided by the launch lock systems at release.

Accordingly, it is desirable to provide a launch lock system that provides increased clearance in all directions upon release, to enable a larger range of motion for isolators. Furthermore, other desirable features and characteristics of the present invention will become apparent from the subsequent detailed description and the appended claims, taken in conjunction with the accompanying drawings and the foregoing technical field and background.

SUMMARY

Provided according to various embodiments is a launch lock system. The launch lock system includes a first housing portion, and a second housing portion spaced apart from the first housing portion. The first housing portion is rigidly coupled to the second housing portion in a first state and the first housing portion movable in all directions relative to the second housing portion in a second state. The launch lock system includes a fastener subassembly coupled to the second housing portion, the fastener subassembly movable relative to the second housing portion from a first fastener position to a second fastener position. The launch lock system includes at least one pivot arm subassembly coupled to the second housing portion. The at least one pivot arm subassembly includes a pivot arm movable relative to the second housing portion between a first position and a second position. The pivot arm is coupled to the first housing portion in the first position. In the first state, the pivot arm is in the first position and cooperates with the fastener subassembly in the first fastener position, and in the second state, the pivot arm is uncoupled from the first housing portion and the fastener subassembly.

The fastener subassembly includes a fastener and a lock wedge, and the lock wedge contacts the pivot arm in the first state. The pivot arm includes a head having a flat contact surface, and the lock wedge includes a lock wedge contact surface that engages with the flat contact surface in the first state. The lock wedge contact surface is spherical. The fastener subassembly includes at least one biasing member coupled to the second housing portion that biases against the lock wedge. The launch lock system includes a release system coupled to the fastener. The release system is configured to release the fastener, and the release of the fastener by the release system moves the fastener subassembly from the first fastener position to the second fastener position and moves the pivot arm from the first position to the second position. The fastener includes a fastener flange, and a second damper member is coupled to the fastener flange and configured to contact an internal retaining flange defined in the second housing portion in the second fastener position. The first housing portion defines a pocket, and the pivot arm includes a head that is at least partially received within the pocket in the first state. The head of the pivot arm includes a bore that receives a pin, the pin is biased by a biasing member and the pin is configured to cooperate with the first housing portion to assist in the movement of the pivot arm to the second position. The second housing portion includes a damper member that contacts the head of the pivot arm in the second position. The at least one pivot subassembly includes at least one pivot arm spring coupled to the pivot arm configured to assist in the movement of the pivot arm to the second position. The first housing portion further comprises a first mount configured to couple the first housing portion to a payload support system associated with a payload, and the second housing portion further comprises a second mount configured to couple the second housing portion to a spacecraft mounting interface associated with a spacecraft.

Further provided is a launch lock system. The launch lock assembly includes a first housing portion, and a second housing portion spaced apart from the first housing portion. The first housing portion is rigidly coupled to the second housing portion in a first state and the first housing portion movable in all directions relative to the second housing portion in a second state. The launch lock assembly includes a fastener subassembly coupled to the second housing portion. The fastener subassembly includes a fastener and a lock wedge. The fastener and the lock wedge movable relative to the second housing portion from a first fastener position to a second fastener position. The launch lock assembly includes at least one pivot arm subassembly coupled to the second housing portion. The at least one pivot arm subassembly includes a pivot arm movable relative to the second housing portion between a first position and a second position. The pivot arm coupled to the first housing portion in the first position. In the first state, the pivot arm is in the first position and in contact with the lock wedge in the first fastener position, and in the second state, the pivot arm is uncoupled from the first housing portion and the lock wedge.

The pivot arm includes a head having a flat contact surface, and the lock wedge includes a lock wedge contact surface that is spherical and engages with the flat contact surface in the first state. The fastener subassembly includes at least one biasing member coupled to the second housing portion that biases against the lock wedge. The launch lock system includes a release system coupled to the fastener. The release system is configured to release the fastener, and the release of the fastener by the release system moves the fastener and the lock wedge from the first fastener position to the second fastener position and moves the pivot arm from the first position to the second position. The fastener includes a fastener flange, and a second damper member is coupled to the fastener flange and configured to contact an internal retaining flange defined in the second housing portion in the second fastener position. The first housing portion defines a pocket, and the pivot arm includes a head that is at least partially received within the pocket in the first state. The head of the pivot arm includes a bore that receives a pin, the pin is biased by a biasing member, and the pin is configured to cooperate with the first housing portion to assist in the movement of the pivot arm to the second position.

Also provided is a launch lock system. The launch lock system includes a first housing portion that defines at least one pocket, and a second housing portion spaced apart from the first housing portion. The first housing portion is rigidly coupled to the second housing portion in a first state and the first housing portion movable in all directions relative to the second housing portion in a second state. The launch lock system includes a fastener subassembly coupled to the second housing portion. The fastener subassembly includes a fastener and a lock wedge. The fastener and the lock wedge are movable relative to the second housing portion from a first fastener position to a second fastener position, and the lock wedge has a lock wedge contact surface. The launch lock system includes at least one pivot arm subassembly coupled to the second housing portion. The at least one pivot arm subassembly includes a pivot arm movable relative to the second housing portion between a first position and a second position, and the pivot arm includes a head that is at least partially received within the pocket and in contact with the lock wedge contact surface in the first position. In the first state, the pivot arm is in the first position and in contact with the lock wedge in the first fastener position, and in the second state, the pivot arm is uncoupled from the first housing portion and the lock wedge.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
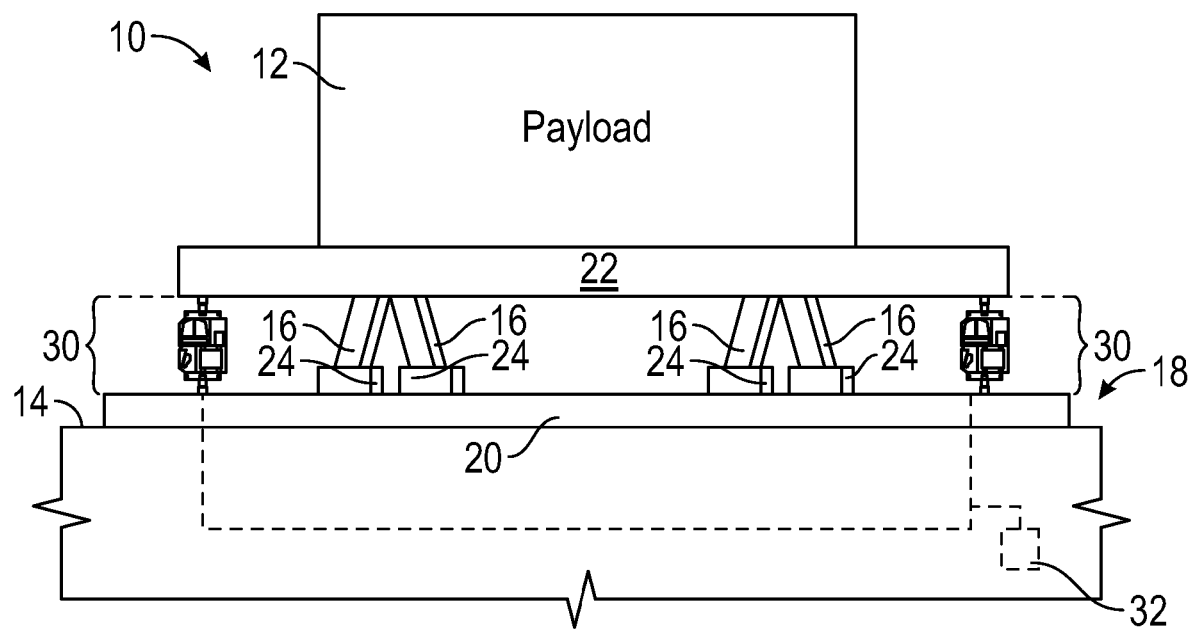
FIG. 1 is a schematic illustration of an exemplary spacecraft isolation system that includes a plurality of launch lock systems in accordance with the various teachings of the present disclosure, in which the launch lock systems are in a first (locked) state.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of payload that would benefit from having a launch lock system with increased release clearance in all directions, and the spacecraft isolation system described herein is merely one exemplary embodiment according to the present disclosure. In addition, while the launch lock system is described herein as being used with a vehicle, such as a spacecraft and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the launch lock system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 2:
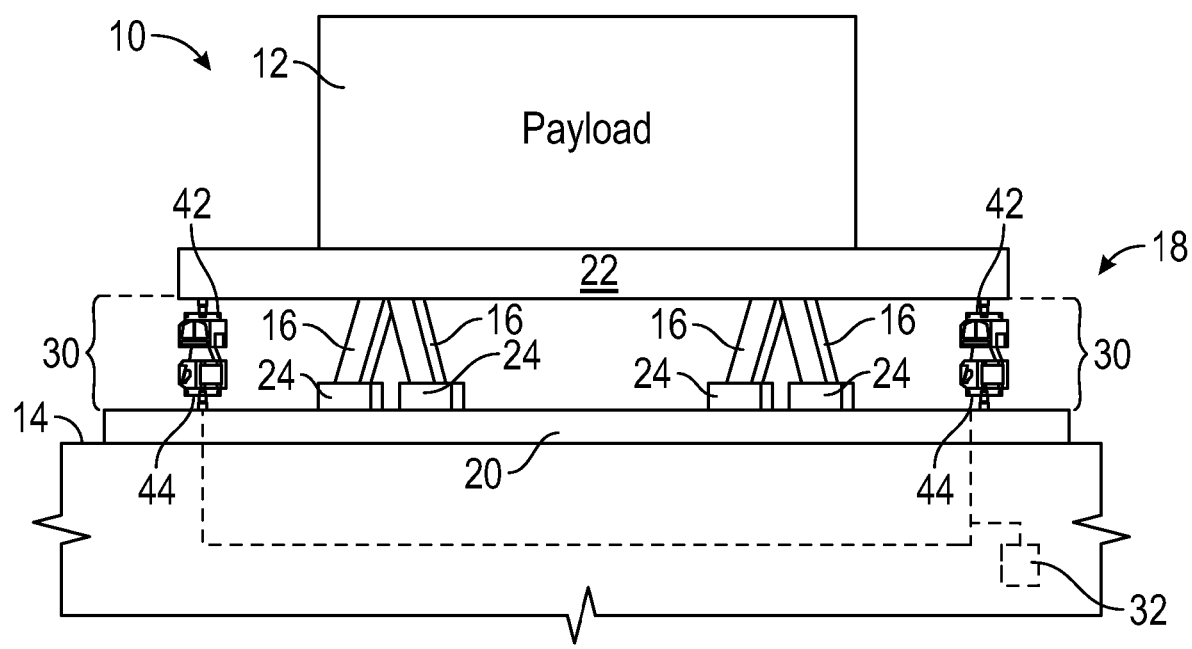
FIG. 2 is a schematic illustration of the exemplary spacecraft isolation system of FIG. 1, in which the launch lock systems are in a second (released) state.

With reference to FIG. 1, a simplified schematic of a spacecraft isolation system 10 is shown in a first (locked) state. FIG. 2 is a simplified schematic of a spacecraft isolation system 10 in a second (released, unlocked) state. In one example, the spacecraft isolation system 10 includes a payload 12, a host spacecraft 14, one or more vibration isolators 16, and a launch lock system 18. Generally, the spacecraft isolation system 10, in the second (released) state shown in FIG. 2, reduces the transmission of vibrations between the payload 12 and the host spacecraft 14 via the vibration isolators 16. In one example, the payload 12 may include one more vibration-sensitive components, such as an optical payload (e.g. telescope) or sensor suite, and spacecraft isolation system 10 may serve to minimize a transmission of vibrations from a vibration-emitting source or sources aboard spacecraft 14, through a spacecraft mounting interface 20, through a payload support structure 22, and to the payload 12. In other embodiments, the payload 12 may include one or more vibration-emitting devices, such as one or more reaction wheels or control moment gyroscopes, and the spacecraft isolation system 10 may serve to reduce the transmission of vibrations from the payload 12 to the spacecraft 14 and any vibration-sensitive components deployed thereon. Thus, generally, the spacecraft isolation system 10 serves to vibrationally isolate the payload 12 from the spacecraft 14.

The payload support structure 22 may comprise any suitable structure for supporting the payload 12, such as an optical bench, platform or the like, that is fabricated from a lightweight, high strength material, including, but not limited to, carbon fiber. Similarly, the spacecraft mounting interface 20 may comprise any suitable structure for coupling the spacecraft isolation system 10 to the spacecraft 14, such as a platform or the like, that is fabricated from a lightweight, high strength material, including, but not limited to, carbon fiber. In one example, the vibration isolators 16 are coupled between the spacecraft mounting interface 20 and the payload support structure 22. In this example, the spacecraft isolation system 10 includes a plurality of single degree of freedom or axially-damping vibration isolators 16 that provide damping along a single longitudinal axis, which are mechanically coupled to the payload support structure 22 and collectively isolate the payload 12 from the spacecraft 14. It should be noted, however, that any suitable isolator may be employed. The vibration isolators 16 may be pivotally coupled to the payload support structure 22, and may be mounted to the spacecraft mounting interface 20 utilizing a plurality of mounting brackets 24, which may provide a pivot-type connection. In one example, the vibration isolators 16 are three parameter isolators, which behave mechanically as a primary spring in parallel with a series-coupled secondary spring and damper, however, the vibration isolators 16 may comprise viscoelastic isolators. As will be discussed, in the first (locked) state, the payload 12 is rigidly coupled to the spacecraft 14 by the launch lock system 18 to shunt significant inertial or shock loads generated during spacecraft launch. In the second (released) state, the launch lock system 18 provides increased clearance in all directions, such as greater than about 0.25 inches (in.), which enables the vibration isolators 16 to move as appropriate to damp the vibrations between the payload 12 and the spacecraft 14.

Figure 3:
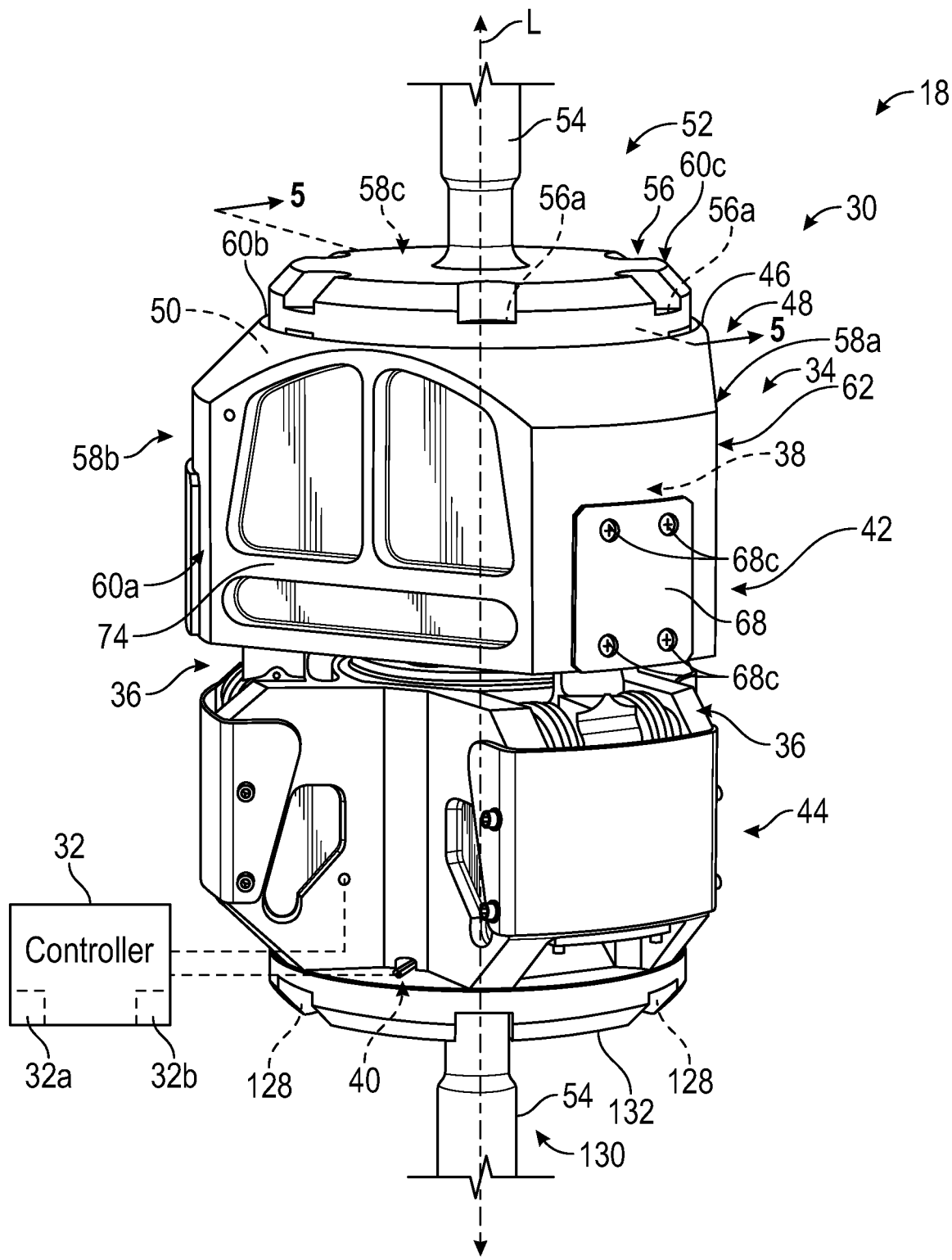
FIG. 3 is a schematic illustration of the launch lock system, which includes an isometric illustration of one launch lock assembly in accordance with the various teachings of the present disclosure.

FIG. 3 is a schematic view of the launch lock system 18, which includes an isometric view of a launch lock assembly 30 and a controller 32. It should be noted that while a single launch lock assembly 30 is shown in FIG. 3, the launch lock system 18 may include any number of launch lock assemblies 30 in communication with the controller 32. As will be discussed, the launch lock assembly 30 is responsive to one or more control signals from the controller 32 to move from the first (locked) state to the second (released) state. In one example, the launch lock assembly 30 includes a housing 34, at least one or a plurality of pivot arm subassemblies 36, a fastener subassembly 38 and a release system 40. The housing 34 extends along a longitudinal axis L, and is substantially cylindrical and symmetric to the longitudinal axis L. The housing 34 is composed of a metal or metal alloy, which may be cast, forged, stamped, additively manufactured, etc. The housing 34 includes a first, top housing portion 42 and a second, bottom housing portion 44. The top housing portion 42 includes a first, top mounting surface 46, a sidewall 48 and defines a top central bore 50.

Figure 4:
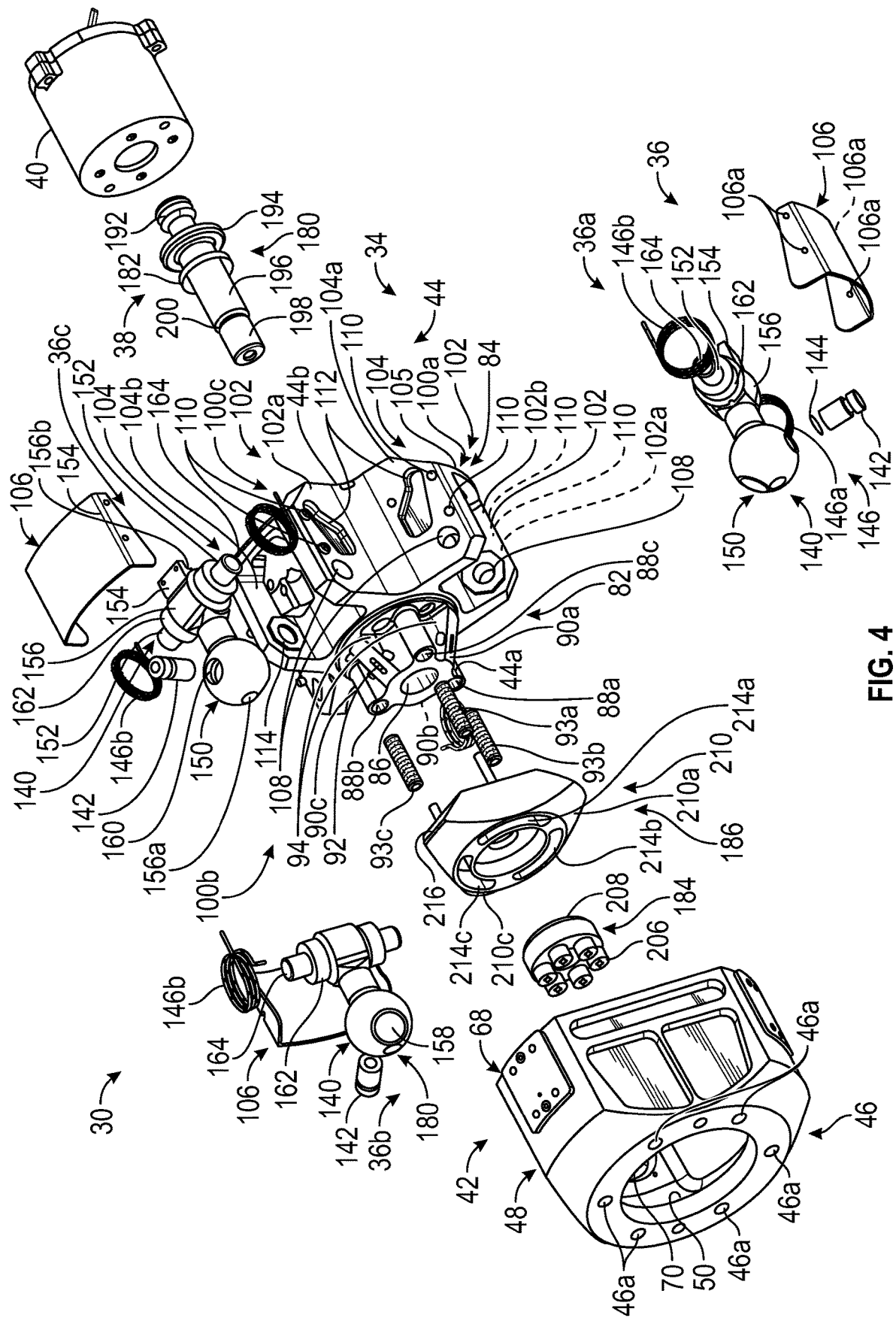
FIG. 4 is a partially exploded view of the launch lock assembly of FIG. 3.

With additional reference to FIG. 4, the top mounting surface 46 defines a substantially planar surface that defines a plurality of bores 46a for coupling a top mount 52 (FIG. 3) to the top housing portion 42. In this example, the bores 46a are spaced apart about the top mounting surface 46, however, the bores 46a may be arranged in any suitable configuration for coupling the top mount 52 (FIG. 3) to the top housing portion 42. In one example, the bores 46a are unthreaded, however, the bores 46a may be threaded, if desired. Each of the bores 46a receive a respective mechanical fastener for coupling the top mount 52 (FIG. 3) to the top housing portion 42. With reference back to FIG. 3, the top mount 52 includes a coupling rod 54, which extends outwardly from a mount base 56. The coupling rod 54 is cylindrical, and is sized to receive a respective mechanical fastener, such as a nut, etc. to couple the top mount 52 to the payload support structure 22 (FIG. 1). The mount base 56 is substantially circular, and is sized and shaped to mate with the top mounting surface 46. The mount base 56 includes one or more bores 56a, which are coaxially aligned with the bores 46a to receive a respective mechanical fastener, such as a bolt, pin, etc., to couple the top mount 52 to the top mounting surface 46. The top mount 52 may be optional and in one example, the coupling rod 54 is a flexible element. It should be noted that in certain implementations, the top mounting surface 46 may be coupled directly to the payload support structure 22.

Figure 5:
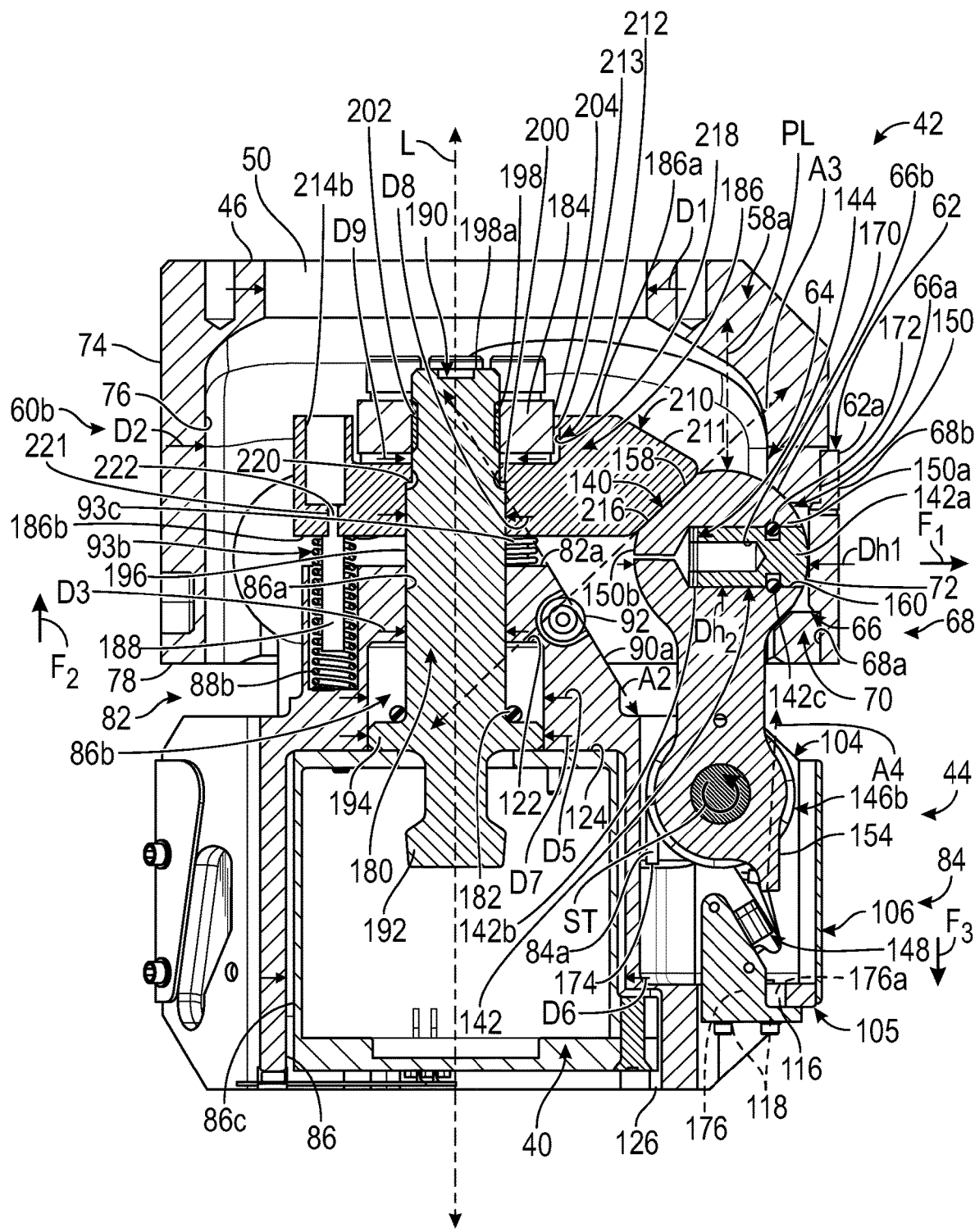
FIG. 5 is a cross-sectional view of the launch lock assembly of FIG. 3, taken along line 5-5 of FIG. 3, in which the launch lock assembly is in the first (locked) state.

The sidewall 48 surrounds the top central bore 50. The sidewall 48 includes a plurality of arm receiving projections 58, and a plurality of interconnecting surfaces 60. In this example, the sidewall 48 includes three arm receiving projections 58a-58c and three interconnecting surfaces 60a-60c, which alternate about a perimeter of the top housing portion 42. Thus, the arm receiving projections 58a-58c are spaced apart about the perimeter of the top housing portion 42. The arm receiving projections 58a-58c each include a first, exterior surface 62, a second, interior surface 64 (FIG. 5) and a pocket aperture 66 that extends from the exterior surface 62 to the interior surface 64 (FIG. 5). With reference to FIG. 5, the interior surface 64 is opposite the exterior surface 62. The pocket aperture 66 is defined from the exterior surface 62 to the interior surface 64. The pocket aperture 66 has an end 66a defined at the exterior surface 62, which is substantially circular, and has an opposed end 66b. The opposed end 66b includes a countersink 70, which extends from the interior surface 64 toward the exterior surface 62. The countersink 70 cooperates with a portion of the pivot arm subassemblies 36 to retain the launch lock assembly 30 in the first (locked) state, as will be discussed. The exterior surface 62 includes a pocket cover 68. The exterior surface 62 may also define a lip 62a for aligning the pocket cover 68 on the arm receiving projections 58a-58c. The pocket cover 68 removably covers the pocket aperture 66. The pocket cover 68 includes a first pocket side 68a opposite a second pocket side 68b and defines a plurality of bores 68c (FIG. 3). The first pocket side 68a includes a protrusion 72, which is circular, and sized to be received within the end 66a of the pocket aperture 66. The protrusion 72 defines a stop for a portion of the pivot arm subassemblies 36. The second pocket side 68b is substantially planar and is sized to enclose the end 66a of the pocket aperture 66. The bores 68c enable one or more mechanical fasteners to be received therethrough to couple the pocket cover 68 to the exterior surface 62. The exterior surface 62 generally defines a plurality of bores, which are coaxially aligned with a respective one of the bores 68c to receive the mechanical fastener for coupling the pocket cover 68 to the exterior surface 62.

The interconnecting surfaces 60a-60c may be slightly curved to join adjacent ones of the arm receiving projections 58a-58c. Each of the interconnecting surfaces 60a-60c may have a first, interconnecting exterior surface 74 opposite a second, interconnecting interior surface 76 (FIG. 5). The interconnecting exterior surface 74 includes one or more recesses or cut-outs, which may reduce a mass of the launch lock assembly 30 and may provide a graspable surface for manipulating the launch lock assembly 30. With brief reference to FIG. 5, the interconnecting interior surface 76 is substantially flat or planar.

The top central bore 50 is defined through the top housing portion 42 from the top mounting surface 46 to a terminal end 78 of the top housing portion 42. The top central bore 50 has a diameter D1 at the top mounting surface 46 that is different, and less than, a diameter D2 of a remainder of the top central bore 50. Generally, the top central bore 50 is enlarged within an area of the top housing portion 42 surrounded by the sidewall 48. The top central bore 50 surrounds and partially encloses a portion of the pivot arm subassemblies 36, a portion of the fastener subassembly 38 and a portion of the bottom housing portion 44.

With reference to FIG. 4, the bottom housing portion 44 is shown. The bottom housing portion 44 includes a fastener guide projection 82 that extends outwardly from an arm base 84. A bottom central bore 86 is defined through the bottom housing portion 44 from the fastener guide projection 82 to the arm base 84. The fastener guide projection 82 is substantially annular and includes at least one or a plurality of spring cavities 88 and at least one or a plurality of ramp surfaces 90. In this example, the fastener guide projection 82 includes three spring cavities 88a-88c and three ramp surfaces 90a-90c. The spring cavities 88a-88c alternate with the ramp surfaces 90a-90c about a perimeter of the fastener guide projection 82. Each of the spring cavities 88a-88c is cylindrical, and is sized to receive a corresponding biasing member or spring 93a-93c associated with the fastener subassembly 38. With reference to FIG. 5, each of the spring cavities 88a-88c extends along an axis parallel to the longitudinal axis L of the launch lock assembly 30, and terminates at a top guide surface 82a such that the top guide surface 82a is planar. Each of the ramp surfaces 90a-90c are defined on the fastener guide projection 82 to be adjacent to a respective one of the pivot arm subassemblies 36 in the first (locked) state, and to be in contact with the respective one of the pivot arm subassemblies 36 in the second (released) state. Each of the ramp surfaces 90a-90c extend along an axis A2, which is transverse or oblique to the longitudinal axis L. In one example, the axis A2 extends at an angle of about 40 degrees to 50 degrees relative to the longitudinal axis L, which facilitates the contact between the respective ramp surface 90a-90c and a respective portion of the pivot arm subassemblies 36. Each of the ramp surfaces 90a-90c also include a first damper member 92. The first damper member 92 is coupled to each of the ramp surfaces 90a-90c so as to extend a distance beyond the ramp surface 90a-90c to contact the portion of the respective one of the pivot arm subassemblies 36 in the second (released) state to absorb vibrations and forces applied by the movement of the portion of the pivot arm subassemblies 36 to the second (released) state. In one example, the first damper member 92 is an elastomeric O-ring, however, any suitable damper may be employed. The first damper member 92 may be coupled to the ramp surface 90a-90c via a mechanical fastener, such as a pin, screw or bolt, which is inserted through one of a pair of opposed sides 94 of the respective ramp surface 90a-90c to retain the first damper member 92.

Figure 4A:
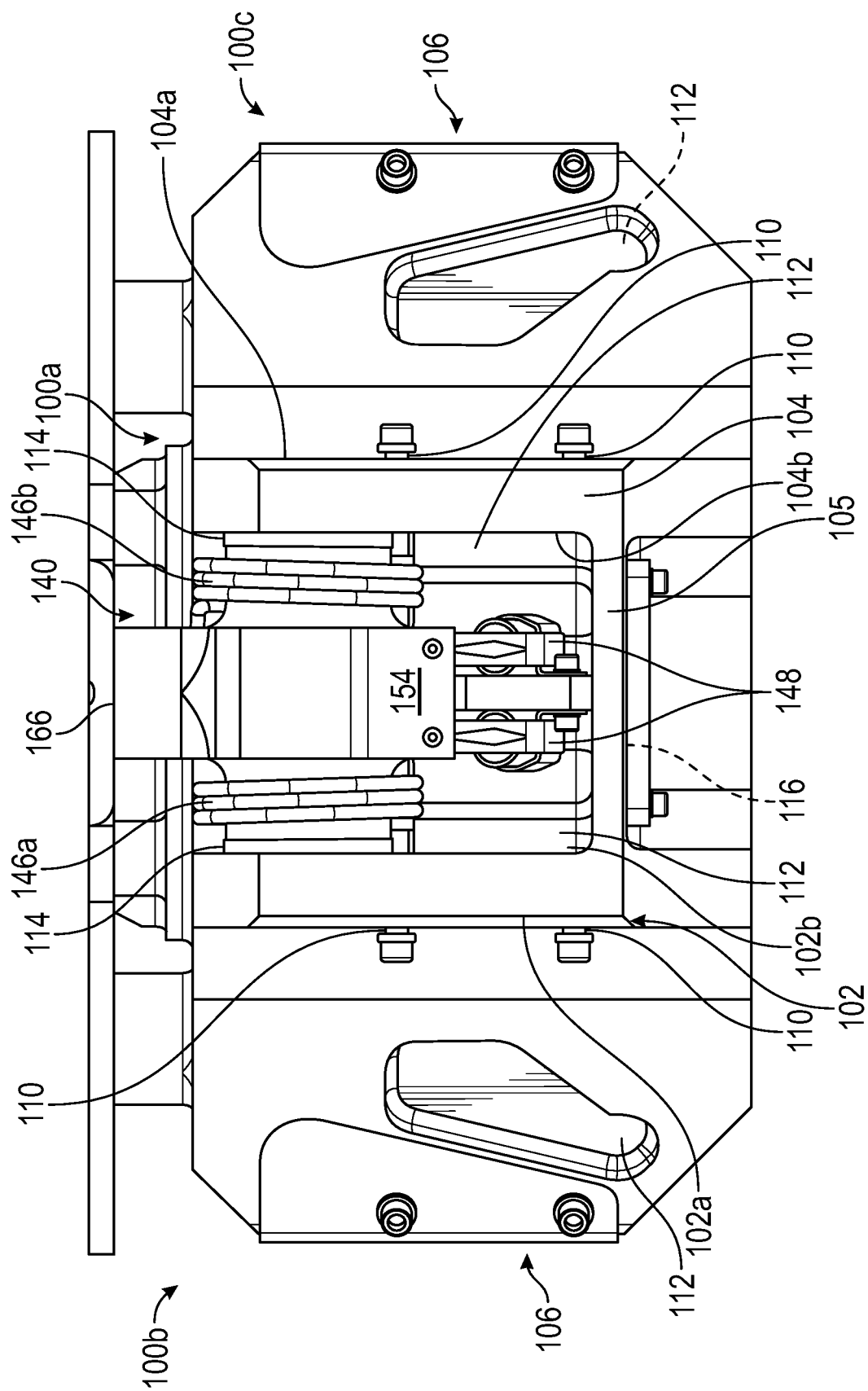
FIG. 4A is a partial front view of the launch lock assembly of FIG. 3 in the first (locked) state, which illustrates one receptacle associated with a bottom housing portion.

The arm base 84 defines a plurality of receptacles 100 that each receive a respective one of the pivot arm subassemblies 36. In this example, the arm base 84 includes three receptacles 100a-100c. Each of the receptacles 100a-100c is substantially U-shaped, and extends outwardly from the arm base 84. Each of the receptacles 100a-100c includes a first receptacle wall 102, an opposite second receptacle wall 104, a third receptacle wall 105, and a receptacle cover 106. As the first receptacle wall 102 and the second receptacle wall 104 are substantially the same, the same reference numerals will be used to denote the same components. The first receptacle wall 102 defines a pivot arm bore 108, a plurality of cover bores 110 and a thrust washer 112. The pivot arm bore 108 is defined through the first receptacle wall 102 from a first side 102a to a second side 102b. The pivot arm bore 108 receives a portion of the pivot arm subassemblies 36. On the second side 102b of the first receptacle wall 102, an annular flange 114 may be defined to provide a seat for a biasing member associated with the pivot arm subassemblies 36. The cover bores 110 are defined through the first side 102a, but in one example, the cover bores 110 do not extend through to the second side 102b. The cover bores 110 are each threaded, and receive a mechanical fastener, such as a screw, to couple the receptacle cover 106 to the first receptacle wall 102. With reference to FIG. 4A, the thrust washer 112 is provided on the second side 102b to provide a good surface for rotation of a pivot arm 140 with minimal friction. With reference back to FIG. 4, the second receptacle wall 104 defines the pivot arm bore 108, the plurality of cover bores 110 and the thrust washer 112 (FIG. 4A). The pivot arm bore 108 is defined through the second receptacle wall 104 from a first side 104a to a second side 104b. On the second side 104b of the second receptacle wall 104, the annular flange 114 may be defined to provide the seat for the biasing member associated with the pivot arm subassemblies 36. The cover bores 110 are defined through the first side 104a, but in one example, the cover bores 110 do not extend through to the second side 104b. The thrust washer 112 is also defined on the second side 104b.

The third receptacle wall 105 interconnects the first receptacle wall 102 and the second receptacle wall 104. With reference to FIG. 5, the third receptacle wall 105 defines a slot 116 and a plurality of coupling bores 118. The slot 116 enables a portion of the pivot arm subassemblies 36 to be positioned through the third receptacle wall 105. The coupling bores 118 couple the portion of the pivot arm subassemblies 36 to the third receptacle wall 105.

The receptacle cover 106 at least partially encloses the respective receptacle 100a-100c, and is removably coupled to each of the receptacles 100a-100c to enable access to the pivot arm subassemblies 36. With reference to FIG. 4, the receptacle cover 106 is substantially C-shaped, and includes a plurality of cover coupling bores 106a. The cover coupling bores 106a are coaxially aligned with the cover bores 110 and receive a respective mechanical fastener, such as a screw, to couple the receptacle cover 106 to the first receptacle wall 102 and the second receptacle wall 104.

With reference to FIG. 5, generally, the bottom central bore 86 extends from a first end 44a of the bottom housing portion 44 to an opposite second end 44b. The bottom central bore 86 has a diameter D3 within the fastener guide projection 82 that is different, and less than a diameter D5 of the bottom central bore 86 within the arm base 84. The bottom central bore 86 also has a diameter D6 within the fastener guide projection 82 that is different and less than the diameter D5. The diameter D3 within the fastener guide projection 82 assists in directing the movement of a portion of the fastener subassembly 38 relative to the bottom housing portion 44. The diameter D5 cooperates with the fastener subassembly 38 to limit a motion of a portion of the fastener subassembly 38 within the bottom housing portion 44. In one example, the difference in the diameters D3, D5 defines an internal retaining flange 122 that acts as a stop to inhibit further advancement of the portion of the fastener subassembly 38. The difference in the diameters D4, D5 also defines a second internal retaining flange 124, which limits an advancement of the release system 40 within the housing 34. The diameter D6 is sized to receive the release system 40. The arm base 84 at the second end 44b may also include a coupling bore 126, which receives a mechanical fastener, such as a screw, bolt, etc. to couple the release system 40 to the housing 34. The portion of the bottom central bore 86 with the diameter D3 may be considered a shank guiding portion 86a, the portion of the bottom central bore 86 with the diameter D5 may be considered a flange guiding portion 86b and the portion of the bottom central bore 86 with the diameter D6 may be considered a release receiving portion 86c.

With reference back to FIG. 3, the second end 44b of the bottom housing portion 44 defines a bottom mounting surface that is a substantially planar surface that defines a plurality of bores 128 for coupling a bottom mount 130 to the bottom housing portion 44. In this example, the bores 128 are spaced apart about the second end 44b, however, the bores 128 may be arranged in any suitable configuration for coupling the bottom mount 130 to the bottom housing portion 44. In one example, the bores 128 are unthreaded, however, the bores 128 may be threaded, if desired. Each of the bores 128 receive a respective mechanical fastener for coupling the bottom mount 130 to the bottom housing portion 44. The bottom mount 130 includes the coupling rod 54, which extends outwardly from a mount base 132. The coupling rod 54 couples the bottom mount 130 to the spacecraft mounting interface 20 (FIG. 1). The mount base 132 is substantially circular, and is sized and shape to mate with the second end 44b. The mount base 132 includes one or more bores (not shown), which are coaxially aligned with the bores 128 to receive a respective mechanical fastener, such as a bolt, pin, etc. to couple the bottom mount 130 to the bottom mounting surface defined at the second end 44b. The bottom mount 130 may be optional and in one example, the coupling rod 54 is a flexible element. It should be noted that in certain implementations, the second end 44b of the bottom housing portion 44 or the bottom mounting surface may be coupled directly to the spacecraft mounting interface 20.

With reference to FIG. 4, in this example, the plurality of pivot arm subassemblies 36 includes three pivot arm assemblies 36a-36c that are each the same. The pivot arm assemblies 36a-36c provide three point contact to the top housing portion 42, and are spaced about 120 degrees apart about the top housing portion 42 and the bottom housing portion 44. Each of the pivot arm assemblies 36a-36c includes a pivot arm 140, a head pin 142, a kickoff biasing member or kickoff spring 144, at least one or a plurality of pivot arm biasing members or pivot arm springs 146, and at least one arm position sensor 148. It should be noted that the head pin 142 and the kickoff spring 144 are optional. The pivot arm 140 includes a head 150, a pair of arms 152 and a tab 154 that are each coupled to a pivot body 156. The pivot arm 140 is composed of a metal or metal alloy, and is cast, forged, additively manufactured, etc. The head 150 is defined at a first end 156a of the pivot body 156, while the tab 154 is defined at an opposite second end 156b. The head 150 is a sphere in toroid, and with reference to FIG. 5, the head 150 has a first head diameter Dh1 that is different and less than a second head diameter Dh2. In one example, the first head diameter Dh1 is about 33 millimeters (mm) to about 43 millimeters (mm), while the second head diameter Dh2 is about 45 millimeters (mm) to about 55 millimeters (mm). The head 150 includes a contact surface 158 and defines a head bore 160. The contact surface 158 is flat, and is defined along an axis A3, which is transverse or oblique to the longitudinal axis L. The contact surface 158 engages with a portion of the fastener subassembly 38 to retain the pivot arm assemblies 36a-36c in the first (locked) state. With brief reference to FIG. 4, the contact surface 158 is defined as a flat circular area 158a on the head 150, and the circular area 158a is sized to ensure contact between the head 150 and the portion of the fastener subassembly 38 in the first (locked) state. With reference back to FIG. 5, the contact surface 158 is defined on the head 150 so as to be offset from a pivot arm longitudinal axis PL. The pivot arm longitudinal axis PL is parallel to the longitudinal axis L in the first (locked) state. The axis A3 of the contact surface 158 is also transverse or oblique to the pivot arm longitudinal axis PL.

The head bore 160 is sized to receive the head pin 142. In this example, the head bore 160 is defined through the head 150 along an axis perpendicular to the pivot arm longitudinal axis PL. The head bore 160 is defined through a side 150a of the head 150 opposite a side 150b that the contact surface 158 is defined. The head bore 160 is generally not defined to extend through the head 150 from side 150a to side 150b to enable the kickoff spring 144 to be retained within the head bore 160, as will be discussed. Generally, the side 150b of the head 150 contacts the countersink 70 of the pocket aperture 66 defined in the top housing portion 42. The shape of the head 150 is configured to mate with the shape of the countersink 70 such that the side 150b of the head 150 is received and at least partially retained by the pocket aperture 66 when the launch lock assembly 30 is in the first (locked) state as shown in FIG. 5.

With reference back to FIG. 4, the pair of arms 152 extend outwardly from the pivot body 156 between the first end 156a and the second end 156b. In this example, the arms 152 are proximate the second end 156b and are spaced apart from the head 150. The arms 152 are cylindrical, and each of the arms 152 may include a flange 162 and a terminal end 164. The flange 162 is circular, and is defined proximate the pivot body 156. The flange 162 provides a surface for receiving a respective one of the pivot arm springs 146. The terminal end 164 is sized to be received in a respective one of the pivot arm bores 108 of the respective receptacle 100a-100c to movably couple the pivot arms 140 to the respective receptacle 100a-100c. Generally, the terminal end 164 of the pivot arms 140 are coupled to the respective receptacle 100a-100c to enable the pivot arm 140 to move or rotate relative to the housing 34.

The tab 154 is defined along the second end 156b of the pivot body 156. With reference to FIG. 5, the tab 154 extends outwardly from the pivot body 156 along an axis A4 that is offset from, but parallel to, the pivot arm longitudinal axis PL. The tab 154 contacts the at least one arm position sensor 148 in the first (locked) state (FIG. 4A) and is spaced apart from the at least one arm position sensor 148 in the second (released) state. It should be noted that the tab 154 may have any desired shape to cooperate with the at least one arm position sensor 148, and the shape illustrated herein is merely exemplary.

With reference back to FIG. 4, the pivot body 156 includes a stem 166 and a main body section 168. The stem 166 couples the head 150 to the main body section 168, and extends outwardly from the main body section 168. The main body section 168 is coupled to the stem 166, the arms 152 and the tab 154. The stem 166 and the main body section 168 are substantially circular, however, the stem 166 and the main body section 168 may have any desired shape.

The head pin 142 is received within the head bore 160. The head pin 142 includes a first head end 142a and a second head end 142b, and is substantially cylindrical. The first head end 142a of the head pin 142 contacts the protrusion 72 of the pocket cover 68 when the launch lock assembly 30 is in the first (locked) state. The head pin 142 is biased against the protrusion 72 of the pocket cover 68 by the kickoff spring 144, which applies a spring force F1 to the second head end 142b. The second head end 142b also defines a counterbore 170. The counterbore 170 reduces a mass of the head pin 142. The head pin 142 may include a retention member 172, which may be coupled in a recess 142c defined about a perimeter of the head pin 142 proximate the first head end 142a. The retention member 172 retains the head pin 142 within the head bore 160.

The kickoff spring 144 is a compression spring, which seats against an end of the head bore 160 and the second head end 142b of the head pin 142. The kickoff spring 144 applies the spring force F1 against the head pin 142 to assist in rotating the pivot arm 140 relative to the housing 34 as the launch lock assembly 30 moves from the first (locked) state to the second (released) state.

In this example, with reference to FIG. 4, the pivot arm assemblies 36a-36c include two pivot arm springs 146a, 146b. Each of the pivot arm springs 146a, 146b comprise torsion springs, and are coupled about the flange 162 of a respective one of the arms 152 and are positioned about the annular flange 114 of the respective one of the first receptacle wall 102 and the second receptacle wall 104 when the pivot arms 140 are coupled to the respective receptacles 100a-100c. With reference to FIG. 5, an end 174 of each of the pivot arm springs 146a, 146b biases against a surface 84a of the arm base 84. Each of the pivot arm springs 146a, 146b applies a spring torque ST about the respective arm 152 to move the pivot arm 140 relative to the housing 34 in the second (released) state, as will be discussed.

The at least one arm position sensor 148 observes a position of the pivot arm 140 and generates sensor signals based thereon. In one example, the at least one arm position sensor 148 comprises a plurality of arm position sensors 148, with two of the arm position sensors 148 associated with each of the pivot arms 140. By using two of the arm position sensors 148 with each of the pivot arms 140, redundancy is provided in case of an issue with one of the arm position sensors 148. Each of the arm position sensors 148 is in communication with the controller 32 (FIG. 3) via a suitable communication medium, including, but not limited to a bus, etc. In this example, each of the arm position sensors 148 comprise microswitches, which are closed when the pivot arm 140 is in a first position when the launch lock assembly 30 is in the first (locked) state. As the pivot arms 140 move or rotate relative to the housing 34 as the launch lock assembly 30 is actuated to the second (released) state, the pivot arms 140 move to a second position (FIG. 7) in which the tab 154 opens the microswitches. The opening of the microswitches or the arm position sensors 148 transmits a signal, via the communication medium, to the controller 32. In this example, the arm position sensors 148 are coupled, via a mounting flange 176, to the third receptacle wall 105. Two of the arm position sensors 148 are coupled to the mounting flange 176 so as to be opened by the tab 154 when the pivot arms 140 are in the second position. The mounting flange 176 is positioned within the slot 116 of the third receptacle wall 105 and coupled to the third receptacle wall via a plurality of mechanical fasteners, which are received through coupling bores 176a defined in the mounting flange and the coupling bores 118 defined in the third receptacle wall 105.

Figure 7:
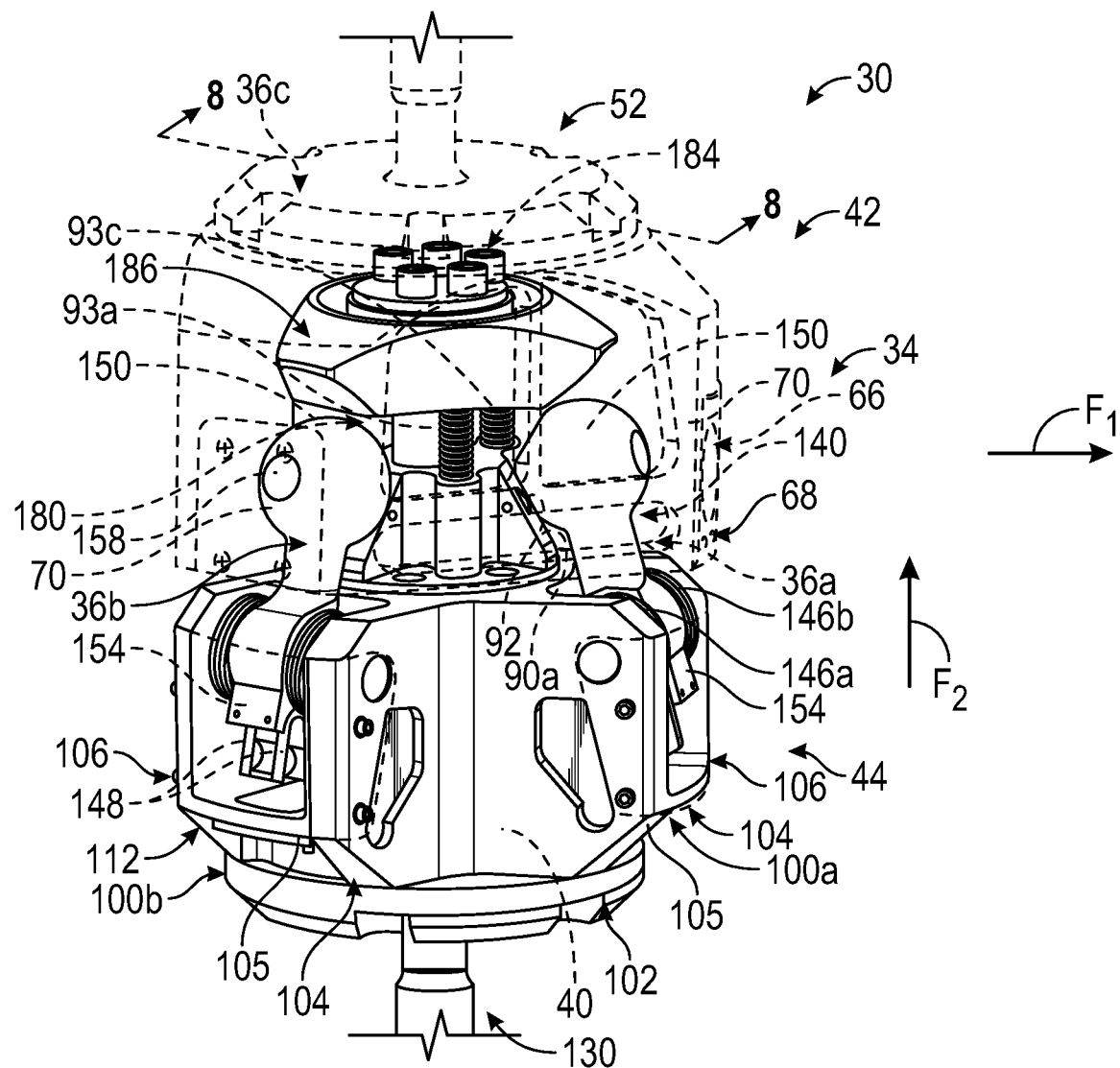
FIG. 7 is a perspective view of the launch lock assembly of FIG. 3 in the second (released) state.

With reference back to FIG. 4, the fastener subassembly 38 includes a fastener 180, a second damper member 182, a nut 184, a lock wedge 186, the springs 93, a plurality of spring guides 188 and a load sensor 190. The fastener 180 is composed of metal or metal alloy, and may be cast, forged, extruded, additively manufactured, etc. In one example, the fastener 180 is an ultrasonic bolt, which cooperates with the load sensor 190 to observe a pre-load on the fastener 180. The fastener 180 includes a fastener head 192, a fastener flange 194, a shank 196 and a threaded terminal end 198. The fastener head 192 is responsive to the release system 40 to move the fastener subassembly 38 between a first fastener position (FIG. 5) and a second fastener position (FIG. 7). The fastener flange 194 is spaced apart from the fastener head 192, and is annular. The fastener flange 194 has a diameter D7, which is different and slightly less than the diameter D5 of the bottom central bore 86 such that the fastener flange 194 is received within the flange guiding portion 86*b* of the bottom central bore 86 and is movable relative to the bottom central bore 86 within the flange guiding portion 86*b*. The fastener flange 194 contacts the internal retaining flange 122 in the second fastener position (FIG. 7) to inhibit a further advancement or movement of the fastener 180 relative to the housing 34.

The shank 196 extends from the fastener flange 194 to the threaded terminal end 198. The shank 196 is smooth or devoid of threads. The shank 196 is received within the shank guiding portion 86*a* of the bottom central bore 86. A diameter D8 of the shank 196 is different and less than the diameter D3 of the shank guiding portion 86*a* such that the shank 196 is movable within the shank guiding portion 86*a*. The diameter D8 is less than the diameter D7 of the fastener flange 194. The threaded terminal end 198 has a diameter D9, which is different and less than the diameter D8, such that a step 200 is defined between the shank 196 and the threaded terminal end 198. The step 200 contacts the lock wedge 186 to move the lock wedge 186 with the fastener 180 as the fastener 180 moves from the first fastener position (FIG. 5) to the second fastener position (FIG. 7), as will be discussed. The threaded terminal end 198 includes a plurality of threads for threadably engaging with the nut 184 to couple the nut 184 to the fastener 180, and defines a terminal end of the fastener 180. The threaded terminal end 198 may also define a recess 198*a*. The recess 198*a* enables the load sensor 190 to be coupled to the fastener 180.

The second damper member 182 is an elastomeric O-ring, however, any suitable damper may be employed. The second damper member 182 is coupled about the shank 196 adjacent to the fastener flange 194 so as to be contained within the flange guiding portion 86*b*. The second damper member 182 absorbs a force of the fastener flange 194 contacting the internal retaining flange 122 of the bottom central bore 86 to reduce vibrations and loads generated during the movement of the launch lock assembly 30 from the first (locked) state to the second (released) state.

The nut 184 is threadably coupled to the fastener 180. The nut 184 may be composed of a metal or metal alloy, and may be cast, stamped, forged, etc. In one example, the nut 184 is a multi-jackbolt tensioner, however, the nut 184 may comprise a standard nut. In this example, the nut 184 defines a threaded central bore 202, an instrument coupling surface 204, at least one jackbolt 206 and a washer 208. The threaded central bore 202 includes a plurality of threads and threadably engages the plurality of threads of the threaded terminal end 198 of the fastener 180. The instrument coupling surface 204 defines a hexagonal coupling surface, in this example, however, other surfaces may be designed for coupling to an instrument to apply a torque to couple the nut 184 to the fastener 180. With reference to FIG. 4, the at least one jackbolt 206 comprises six jackbolts 206, which are spaced apart about a perimeter of the nut 184. The jackbolts 206 extend through respective bores defined in the nut 184 to contact the washer 208. The jackbolts 206, when tightened, apply a force against the washer 208 to further clamp the nut 184 to the fastener 180. The washer 208 is coupled to the nut 184 on a side of the nut opposite the jackbolts 206.

The lock wedge 186 is substantially shaped like a triangular prism. The lock wedge 186 includes a plurality of wedge locking projections 210 or three wedge locking projections 210*a*-210*c*, and defines a central wedge bore 212 and a plurality of annular slots 214. The wedge locking projections 210*a*-210*c* are spaced apart about the central wedge bore 212. With reference to FIG. 5, each the wedge locking projections 210*a*-210*c* includes a lock wedge contact surface or lock contact surface 216. The lock contact surface 216 is defined at an end 211 of the wedge locking projections 210*a*-210*c* that is opposite an end 213 of the wedge locking projections 210*a*-210*c* coupled to the central wedge bore 212. The lock contact surface 216 is defined to extend along the axis A3, which is transverse or oblique to the longitudinal axis L. The lock contact surface 216 is spherical, and has a radius of curvature of about 800 millimeters (mm.) to about 820 millimeters (mm.). The lock contact surface 216 contacts or cooperates with the contact surface 158 of the respective pivot arm 140 to lock the pivot arm 140 in the first position (FIG. 5). In addition, the contact between the lock contact surface 216 and the contact surface 158 of the pivot arm 140 applies a radial load to the head 150 of the pivot arm 140, which causes the head 150 to engage the countersink 70 defined by the pocket aperture 66 in the top housing portion 42. By providing the lock contact surface 216 as a spherical surface with a radius of curvature that engages with the planar or flat contact surface 158 of the pivot arm 140, the load applied by the lock wedge 186 to the pivot arm 140 is more evenly distributed over the pivot arm 140. Thus, in this example, the lock wedge 186 engages with the pivot arm 140 via a spherical (the lock contact surface 216) to flat surface contact (the contact surface 158). The three spherical surfaces or the lock contact surfaces 216 on the lock wedge 186 provide three points of contact against the three flat contact surfaces 158 of the pivot arms 140. This allows the lock wedge 186 to self-align prior to tightening. Upon tightening, the three points of contact grow to circular contact patches with an adequate area that reduces contact stresses.

The central wedge bore 212 extends through the lock wedge 186 from a first wedge side 186*a* to an opposite second wedge side 186*b*. A counterbore 218 is defined about the central wedge bore 212 at the first wedge side 186*a*. The counterbore 218 is sized to receive the nut 184 such that the nut 184 is contained substantially within the lock wedge 186. A remainder of the central wedge bore 212 receives the shank 196. In one example, the central wedge bore 212 has an internal lip 220. The internal lip 220 projects radially inward within the central wedge bore 212 to cooperate with the step 200 of the fastener 180. The contact between the internal lip 220 and the step 200 of the fastener 180 causes the lock wedge 186 to move with the fastener 180, as will be discussed. The plurality of annular slots 214 includes three annular slots 214*a*-214*c*. The annular slots 214*a*-214*c* are defined about the perimeter of the central wedge bore 212. The annular slots 214*a*-214*c* are in communication with a respective one of the spring guides 188, and in this example, a respective one of the spring guides 188 extends from a respective one of the annular slots 214*a*-214*c*. The annular slots 214*a*-214*c* are defined to extend through the first wedge side 186*a* toward the second wedge side 186*b*. Each of the annular slots 214*a*-214*c* may define a bore 221 at the second wedge side 186*b* for coupling a respective one of the spring guides 188a-188c to the lock wedge 186. The annular slots 214a-214c may also reduce a mass of the launch lock assembly 30.

The springs 93 includes the three springs 93a-93c. A respective one of the springs 93a-93c is received within a respective one of the spring cavities 88a-88c. In this example, the springs 93a-93c are each compression springs, which apply a spring force F2 to the second wedge side 186b of the lock wedge 186 assist in moving the lock wedge 186 and the fastener 180. As will be discussed, the springs 93a-93c assist the fastener subassembly 38 (the fastener 180 and the lock wedge 186) in moving from the first fastener position (FIG. 5) to the second fastener position (FIG. 7).

In this example, the spring guides 188 include three spring guides 188a-188c. A respective spring guide 188a-188c is positioned within a respective one of the springs 93a-93c to guide a movement or elongation of the respective spring 93a-93c. The spring guides 188a-188c are cylindrical posts in this example, which may include a reduced diameter at a coupling end 222. The coupling end 222 couples a respective one of the spring guides 188a-188c to the respective one of the annular slots 214a-214c. The coupling end 222 of the respective one of the spring guides 188a-188c is received within the bore 221 of the respective one of the annular slots 214a-214c to couple the spring guide 188a-188c to the lock wedge 186. In one example, the coupling end 222 may be press fit into the bore 221, however, the spring guides 188a-188c may be coupled to the lock wedge 186 via any suitable technique such as welding, adhesives, etc.

The load sensor 190 is coupled to the recess 198a defined in the threaded terminal end 198 of the fastener 180. In one example, the load sensor 190 is a transducer, which observes an amount of pre-load force applied to the fastener 180 and generates sensor signals based on the observation. The load sensor 190 may be in communication with the controller 32 (FIG. 3) via a suitable communication medium, including, but not limited to a bus, etc. In certain embodiments, the load sensor 190 is coupled to the fastener 180 during the installation or tightening of the fastener 180, and may be removed once the fastener 180 is installed.

The release system 40 is received within the release receiving portion 86c of the bottom central bore 86. The release system 40 is coupled about the fastener head 192 of the fastener 180, and is operable to apply a force F3 to the fastener 180. The force F3 retains the fastener 180 in the first fastener position (FIG. 5) against the force F2 of the springs 93a-93c. In this example, the release system 40 is a conventional fuse wire based redundant initiator release system, which is responsive to one or more control signals from the controller 32 (FIG. 3) to cause a release of the fastener 180. Briefly, the release system 40 includes redundant fuse wires, which hold a restraint wire that is wrapped around a spool that retains the fastener head 192 of the fastener 180. Based on the receipt of the control signal from the controller 32 (FIG. 3), one of the fuse wires melts, which releases the fastener head 192 of the fastener 180 to enable the fastener 180 and the lock wedge 186 to move from the first fastener position (FIG. 5) to the second fastener position (FIG. 7).

With reference back to FIG. 3, in one example, the controller 32 may be associated with the spacecraft 14. The controller 32 includes at least one processor 32a and a computer readable storage device or media 32b. The processor 32a can be any custom made or commercially available processor, a central processing unit (CPU), an auxiliary processor among several processors associated with the controller 32, a semiconductor based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media 32b may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 32 in controlling components associated with the launch lock assembly 30.

The instructions may include one or more separate programs, each of which comprises an ordered listing of executable instructions for implementing logical functions. The instructions, when executed by the processor, receive and process input signals from the arm position sensors 148, the load sensor 190, a source of user input, perform logic, calculations, methods and/or algorithms for controlling the components of the launch lock assembly 30, and generate signals to components of the spacecraft 14 based on the logic, calculations, methods, and/or algorithms. Although only one controller 32 is shown, embodiments of the spacecraft 14 can include any number of control modules that communicate over any suitable communication medium or a combination of communication mediums and that cooperate to process the signals associated with the launch lock assembly 30, perform logic, calculations, methods, and/or algorithms, and generate control signals to the release system 40 of the launch lock assembly 30.

In various embodiments, one or more instructions of the controller 32, when executed by the processor, receive and process signals from the arm position sensors 148 to determine whether the fastener 180 has moved from the first fastener position (FIG. 5) to the second fastener position (FIG. 7) based on a movement of the pivot arms 140 from the first position (FIG. 5) to the second position (FIG. 7). The one or more instructions of the controller 32, when executed by the processor, receive and process signals from the load sensor 190 to determine an amount of pre-load applied to the fastener 180. The one or more instructions of the controller 32, when executed by the processor, receive and process input from a source of user input, for example, and based on the user input, output one or more control signals to the release system 40 to release the fastener 180. In one example, the one or more control signals comprise a current of at least three amperes (amps) that is applied to the release system 40. For example, the controller 32 may be responsive to user input to a user input device to output the control signals to the release system 40 to release the fastener 180 to move the launch lock assembly 30 from the first (locked) state to the second (released) state. It should be noted that the controller 32 may determine to output the control signals to the release system 40 based on other inputs, such as sensor signals from a vibration sensor, a timer, etc.

In one example, with reference to FIG. 4, in order to assemble the launch lock assembly 30, with the housing 34 formed, the first damper members 92 are coupled to the respective ramp surfaces 90a-90c. The pivot arm springs 146a, 146b are coupled to each of the respective arms 152. The kickoff spring 144 is positioned within each of the respective head bores 160. Each of the pivot arms 140 are coupled to the bottom housing portion 44 such that the arms 152 are received within the respective pivot arm bores 108. The arm position sensors 148 are coupled on the respective mounting flange 176 (FIG. 5) and the mounting flange 176 is coupled to the third receptacle wall 105. The receptacle cover 106 is coupled to the respective receptacle 100a-100c. The springs 93a-93b are positioned within the respective spring cavity 88a-88c. With the fastener 180 coupled to the release system 40 and the second damper member 182 coupled to the shank 196, the fastener 180 is inserted into the bottom central bore 86. The fastener 180 is coupled to the release system 40 such that the release system 40 applies the force F3 to the fastener 180 to hold the fastener 180 in the first fastener position. The lock wedge 186 is coupled to the threaded terminal end 198 of the fastener 180 and the nut 184 is positioned onto the threaded terminal end 198. The top housing portion 42, with the pocket covers 68 coupled over the respective pocket apertures 66, is positioned over the bottom housing portion 44.

Figure 6:
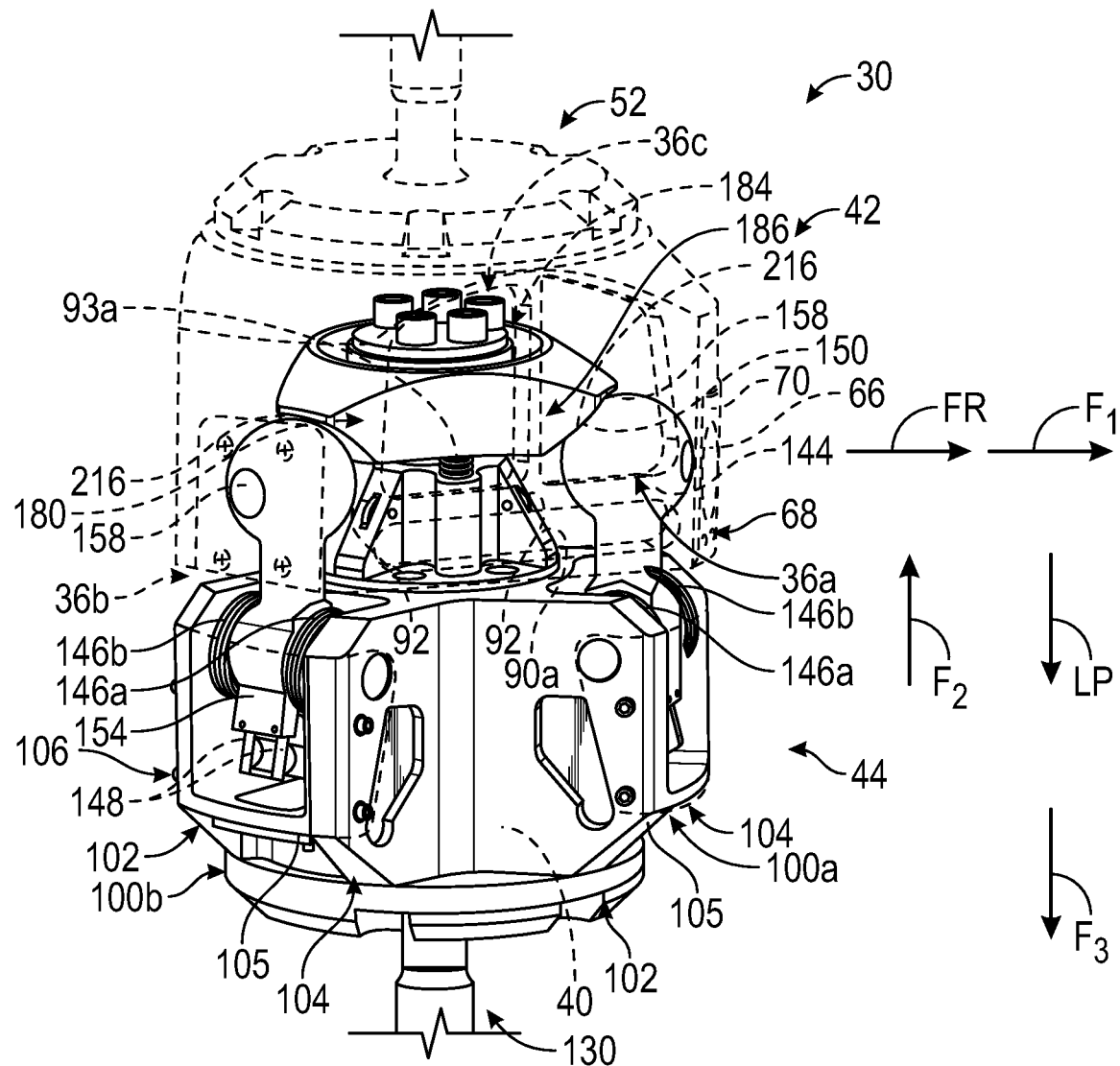
FIG. 6 is a perspective view of the launch lock assembly of FIG. 3 in the first (locked) state.

With reference to FIG. 6, the nut 184 is tightened to apply a pre-load LP to the fastener 180. The pre-load LP applied to the fastener 180 via the nut 184 pulls the lock wedge 186 down against the force F2 of the springs 93a-93c. The pre-load LP also causes the lock wedge 186 to contact the head 150 of each of the pivot arms 140, which drives the heads 150 into the countersink 70 of each of the respective pocket apertures 66 such that the heads 150 apply a radial force FR to the top housing portion 42. Thus, the pivot arms 140 are coupled to the top housing portion 42 in the first position and the head 150 of the pivot arms 140 is at least partially received within the respective countersink 70, which defines a pocket for at least partially receiving the respective head 150. The radial force FR is greater than the force F1 of the kickoff spring 144. The contact between the head 150 of each of the pivot arms 140 and the countersink 70 of the top housing portion 42 locks the top housing portion 42 and the launch lock assembly 30 in the first (locked) state and places the top housing portion 42 in a radial preload. Thus, in the first (locked) state, the launch lock assembly 30 is in axial compression (via the nut 184 and the fastener 180) and radial compression (via the engagement of the pivot arms 140 with the pocket apertures 66 of the top housing portion 42). In this example, the first (locked) state, the launch lock assembly 30 withstands tension loads of at least 20,000 pounds (lb.).

Figure 8:
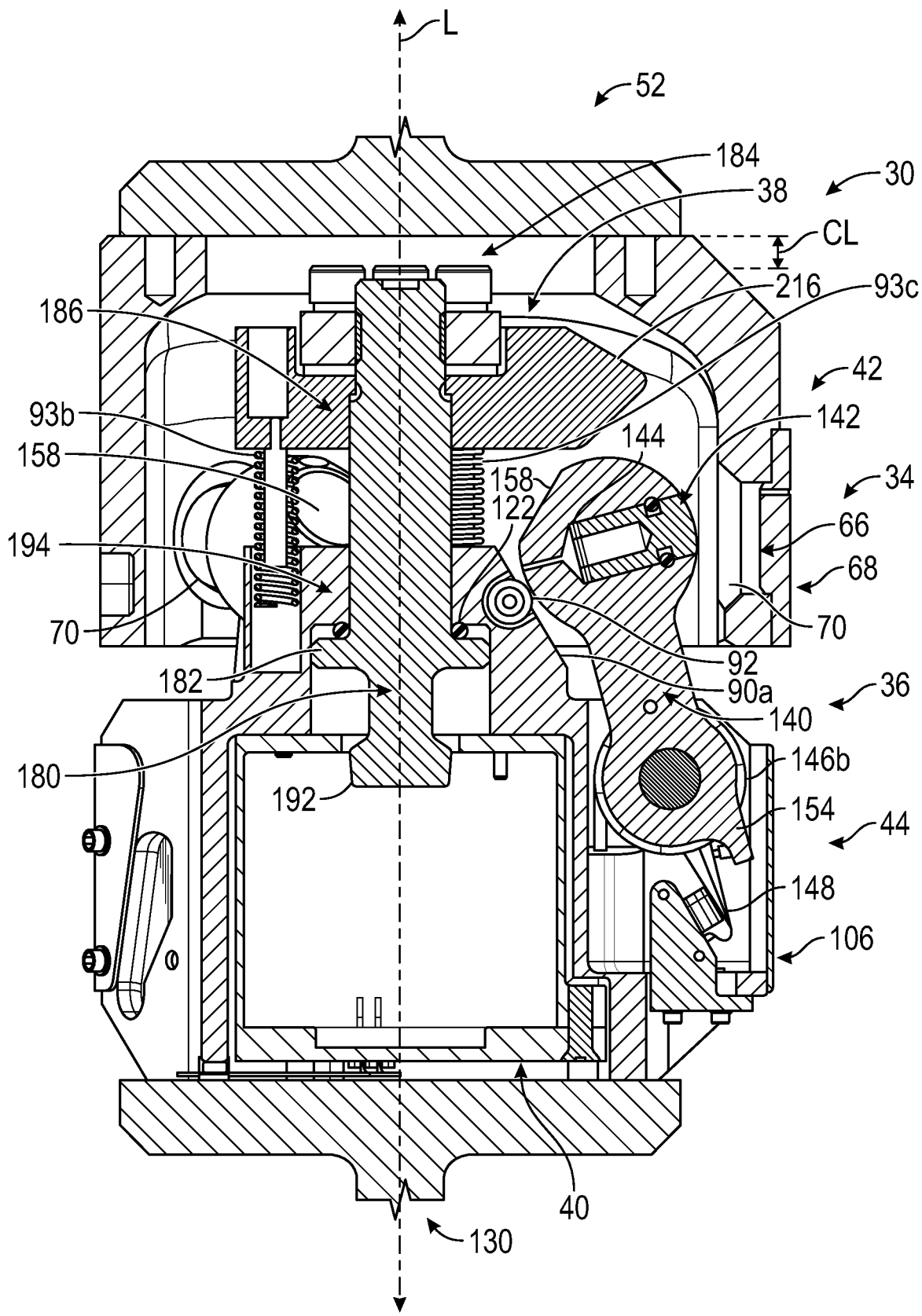
FIG. 8 is a cross-sectional view of the launch lock assembly of FIG. 7, taken along line 8-8 of FIG. 7, in which the launch lock assembly is in the second (released) state.

With reference to FIG. 7, the launch lock assembly 30 is shown in the second (released) state. In order to move the launch lock assembly 30 from the first (locked) state (FIG. 6) to the second (released) state, in one example, the controller 32 (FIG. 3) outputs one or more control signals to the release system 40. Based on the control signals, one of the fuse wires of the release system 40 melts, which releases the fastener 180 from the release system 40. With reference to FIG. 8, the release of the fastener 180 enables the spring force F2 of the springs 93a-93c to move the lock wedge 186 and the fastener 180 along the longitudinal axis L toward the top housing portion 42. The fastener 180 advances within the bottom central bore 86 until the second damper member 182 contacts and is compressed against the internal retaining flange 122 by the fastener flange 194. The second damper member 182 reduces the vibrations/loads applied to the launch lock assembly 30 as the fastener 180 moves into the second fastener position (shown in FIG. 8). In one example, the fastener 180 moves or translates about 10 millimeters (mm) to about 20 millimeters (mm) from the first fastener position to the second fastener position. Thus, generally, the release system 40 releases the fastener 180 to move the fastener subassembly 38 from the first fastener position (FIG. 5) to the second fastener position (FIG. 8). The upward movement of the fastener 180 or the movement of the fastener 180 from the first fastener position to the second fastener position causes the lock wedge 186 to move correspondingly, which removes the radial preload FR.

With the lock contact surface 216 spaced apart from the contact surface 158 of the head 150, the kickoff springs 144 apply the force F1 to the head pin 142, which causes the head pin 142 to push against the protrusion 72 of the pocket cover 68. As the lock wedge 186 is no longer in contact with the pivot arms 140, the force applied by the kickoff springs 144 to the respective one of the head pins 142 cooperates with the respective pivot arm springs 146a, 146b to rotate the respective pivot arms 140 from the first position (FIG. 5) to the second position (shown in FIG. 8). In one example, the pivot arms 140 rotate about 10 degrees to about 20 degrees from the first position to the second position. The pivot arms 140 rotate or pivot into the second position until the head 150 contacts a respective one of the first damper members 92. Thus, the pivot arms 140 are spaced apart from or uncoupled from the top housing portion 42 in the second position. The first damper member 92 reduces the vibrations/loads applied to the launch lock assembly 30 as the pivot arms 140 move into the second position. With the pivot arms 140 in the second position, and the fastener 180 and the lock wedge 186 in the second fastener position, the top housing portion 42 is released from the bottom housing portion 44 and free to move in all directions relative to the bottom housing portion 44. The movement of the top housing portion 42 relative to the bottom housing portion 44 in all directions enables the vibration isolators 16 (FIG. 1) to move as appropriate to damp the vibrations between the payload 12 and the spacecraft 14 (FIG. 1).

In the second (released) state, the launch lock assembly 30 provides increased clearance CL in all directions, such as greater than about 0.25 inches (in.), between the nut 184 and the top housing portion 42. The clearance CL enables the vibration isolators 16 (FIG. 1) to move as appropriate to damp the vibrations between the payload 12 and the spacecraft 14 (FIG. 1). Generally, the launch lock assembly 30 provides the increased clearance CL with limited or reduced shock loads and/or vibrations applied to the vibration isolators 16 (FIG. 1), which protects the vibration isolators 16 as the launch lock assembly 30 moves from the first (locked) state to the second (released) state. The reduced shock loads also protect any shock sensitive components on the payload 12 and/or the spacecraft 14.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A launch lock system, comprising:
   a first housing portion;
   a second housing portion spaced apart from the first housing portion, the first housing portion rigidly coupled to the second housing portion in a first state and the first housing portion movable in all directions relative to the second housing portion in a second state;
   a fastener subassembly coupled to the second housing portion, the fastener subassembly movable relative to the second housing portion from a first fastener position to a second fastener position; and
   at least one pivot arm subassembly coupled to the second housing portion, the at least one pivot arm subassembly including a pivot arm movable relative to the second housing portion between a first position and a second position, the pivot arm having a first end opposite a second end, the pivot arm having a head defined at the first end and the second end is pivotably coupled to second housing portion, the head of the pivot arm coupled to the first housing portion in the first position,
   wherein, in the first state, the pivot arm is in the first position and cooperates with the fastener subassembly in the first fastener position, and in the second state, the pivot arm is spaced apart from the first housing portion and the fastener subassembly.

2. The launch lock system of claim 1, wherein the fastener subassembly includes a fastener and a lock wedge, and the lock wedge contacts the head of the pivot arm in the first state.

3. The launch lock system of claim 2, wherein the head has a flat contact surface, and the lock wedge includes a lock wedge contact surface that engages with the flat contact surface in the first state.

4. The launch lock system of claim 3, wherein the lock wedge contact surface is spherical.

5. The launch lock system of claim 2, wherein the fastener subassembly includes at least one biasing member coupled to the second housing portion that biases against the lock wedge.

6. The launch lock system of claim 2, further comprising a release system coupled to the fastener, the release system configured to release the fastener, and the release of the fastener by the release system moves the fastener subassembly from the first fastener position to the second fastener position and moves the pivot arm from the first position to the second position.

7. The launch lock system of claim 2, wherein the fastener includes a fastener flange, with a second damper member coupled to the fastener flange and configured to contact an internal retaining flange defined in the second housing portion in the second fastener position.

8. The launch lock system of claim 1, wherein the at least one pivot subassembly includes at least one pivot arm spring coupled to the pivot arm configured to assist in the movement of the pivot arm to the second position.

9. The launch lock system of claim 1, wherein the first housing portion further comprises a first mount configured to couple the first housing portion to a payload support system associated with a payload, and the second housing portion further comprises a second mount configured to couple the second housing portion to a spacecraft mounting interface associated with a spacecraft.

10. A launch lock system, comprising:
    a first housing portion that defines a pocket;
    a second housing portion spaced apart from the first housing portion, the first housing portion rigidly coupled to the second housing portion in a first state and the first housing portion movable in all directions relative to the second housing portion in a second state;
    a fastener subassembly coupled to the second housing portion, the fastener subassembly movable relative to the second housing portion from a first fastener position to a second fastener position; and
    at least one pivot arm subassembly coupled to the second housing portion, the at least one pivot arm subassembly including a pivot arm movable relative to the second housing portion between a first position and a second position, the pivot arm coupled to the first housing portion in the first position, the pivot arm includes a head that is at least partially received within the pocket in the first state, the head of the pivot arm includes a bore that receives a pin, the pin is biased by a biasing member and the pin is configured to cooperate with the first housing portion to assist in the movement of the pivot arm to the second position,
    wherein, in the first state, the pivot arm is in the first position and cooperates with the fastener subassembly in the first fastener position, and in the second state, the pivot arm is uncoupled from the first housing portion and the fastener subassembly.

11. The launch lock system of claim 10, wherein the second housing portion includes a damper member that contacts the head of the pivot arm in the second position.

12. A launch lock system, comprising:
    a first housing portion;
    a second housing portion spaced apart from the first housing portion, the first housing portion rigidly coupled to the second housing portion in a first state and the first housing portion movable in all directions relative to the second housing portion in a second state;
    a fastener subassembly coupled to the second housing portion, the fastener subassembly including a fastener and a lock wedge, the fastener and the lock wedge movable relative to the second housing portion from a first fastener position to a second fastener position; and
    at least one pivot arm subassembly coupled to the second housing portion, the at least one pivot arm subassembly including a pivot arm movable relative to the second housing portion between a first position and a second position, the pivot arm having a first end opposite a second end, with a head defined at the first end and the second end is pivotably coupled to the second housing portion, the head of the pivot arm coupled to the lock wedge and the first housing portion in the first position,
    wherein, in the first state, the pivot arm is in the first position and in contact with the lock wedge in the first fastener position, and in the second state, the pivot arm is uncoupled from the first housing portion and the lock wedge.

13. The launch lock system of claim 12, wherein the head has a flat contact surface, and the lock wedge includes a lock wedge contact surface that is spherical and engages with the flat contact surface in the first state.

14. The launch lock system of claim 12, wherein the fastener subassembly includes at least one biasing member coupled to the second housing portion that biases against the lock wedge.

15. The launch lock system of claim 12, further comprising a release system coupled to the fastener, the release system configured to release the fastener, and the release of the fastener by the release system moves the fastener and the lock wedge from the first fastener position to the second fastener position and moves the pivot arm from the first position to the second position.

16. The launch lock system of claim 12, wherein the fastener includes a fastener flange, with a second damper member coupled to the fastener flange and configured to contact an internal retaining flange defined in the second housing portion in the second fastener position.

17. The launch lock system of claim 12, wherein the first housing portion defines a pocket, and the head is at least partially received within the pocket in the first state.

18. The launch lock system of claim 17, wherein the head of the pivot arm includes a bore that receives a pin, the pin is biased by a biasing member, and the pin is configured to cooperate with the first housing portion to assist in the movement of the pivot arm to the second position.

* * * * *